United States Patent [19]

Tyree, Jr.

[11] 4,187,325

[45] Feb. 5, 1980

[54] STEAM COOKING WITH DIRECT CONTACT $CO_2$ COOLING

[76] Inventor: Lewis Tyree, Jr., 145 Briarwood Ave., N., Oak Brook, Ill. 60521

[21] Appl. No.: 8,862

[22] Filed: Feb. 2, 1979

Related U.S. Application Data

[62] Division of Ser. No. 831,227, Sep. 7, 1977, Pat. No. 4,137,723.

[51] Int. Cl.² ............................................ A47J 27/092
[52] U.S. Cl. ............................. 426/510; 62/64; 62/85; 62/373; 99/357; 99/470; 426/523; 426/524
[58] Field of Search ............ 62/64, 85, 373, 384, 62/475; 426/510, 523, 524; 99/357, 470

[56] References Cited

U.S. PATENT DOCUMENTS

| | | | |
|---|---|---|---|
| 2,944,479 | 7/1960 | Walsh et al. | 99/470 X |
| 3,213,634 | 10/1965 | Granata | 426/524 X |
| 3,480,451 | 11/1969 | Hardison | 99/470 X |
| 3,672,908 | 6/1972 | Hice | 426/523 |
| 3,754,407 | 8/1973 | Tyree | 62/55 |
| 3,818,818 | 6/1974 | Hice, Sr. | 99/470 X |

FOREIGN PATENT DOCUMENTS 1313281  4/1973  United Kingdom ................. 99/470

Primary Examiner—Arthur D. Kellogg
Attorney, Agent, or Firm—Fitch, Even & Tabin

[57] ABSTRACT

Material is cooled by direct contact with $CO_2$, and the $CO_2$ vapor is recovered. A coolant reservoir is created in a holding tank wherein $CO_2$ vapor, $CO_2$ liquid and solid $CO_2$ exist in equilibrium in the form of slush plus vapor. Liquid $CO_2$ is supplied to a cooling chamber to cool the material by direct contact, creating contaminated $CO_2$ vapor. The contaminated $CO_2$ vapor is removed and directed to the coolant reservoir to condense the $CO_2$ vapor and any contaminants which liquefy at temperatures above $-69°$ F. by melting solid $CO_2$. Clean $CO_2$ vapor and any noncondensables are withdrawn from the holding tank and the withdrawn $CO_2$ vapor is reliquefied and returned to the $CO_2$ storage vesssel. Condensable contaminants are periodically removed from the holding tank by heating to a temperature where they can be blown out the bottom.

11 Claims, 2 Drawing Figures

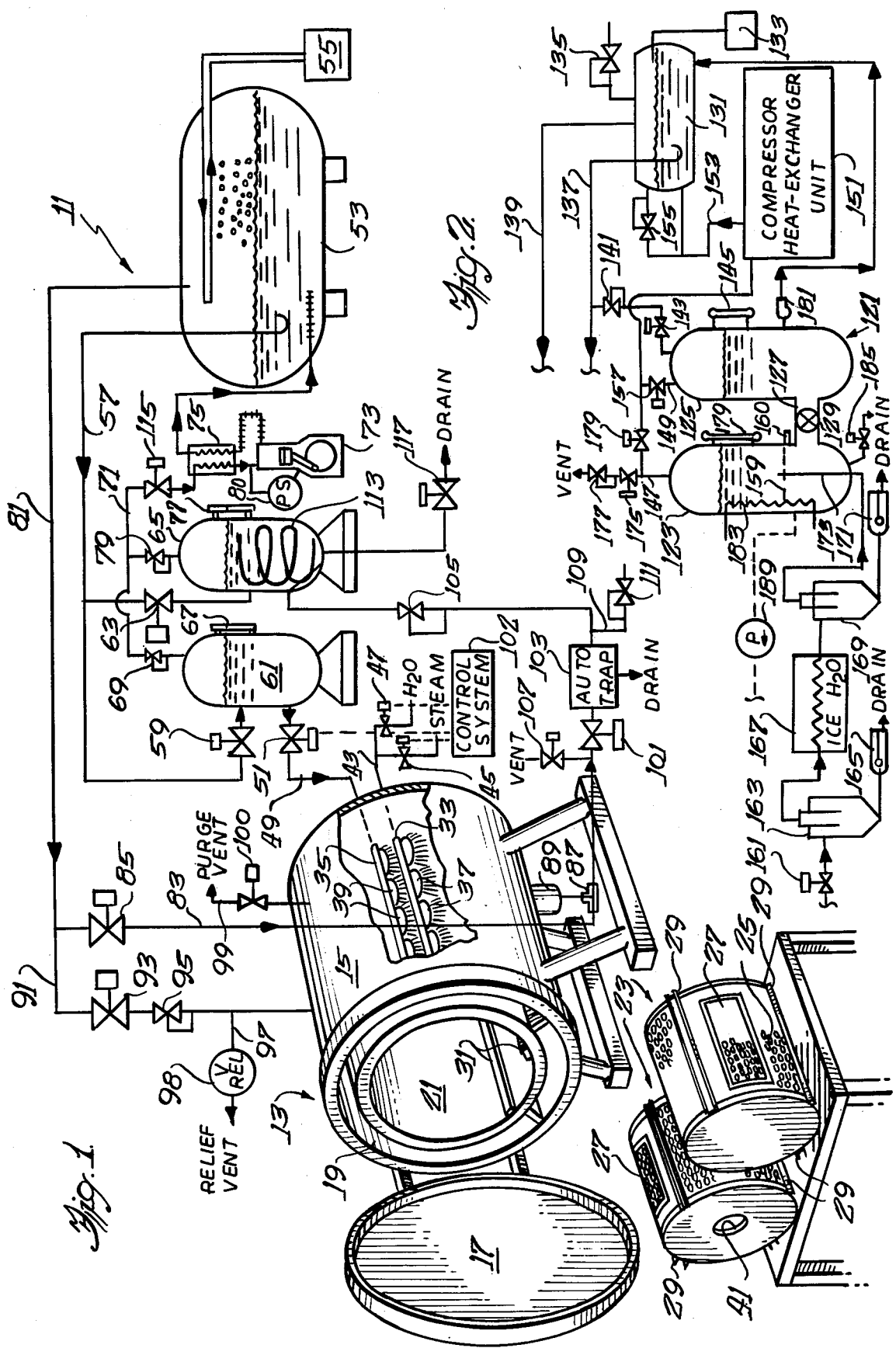

STEAM COOKING WITH DIRECT CONTACT $CO_2$ COOLING

This is a division, of application Ser. No. 831,227, filed Sept. 7, 1977, now U.S. Pat. No. 4,137,723

This invention relates to carbon dioxide refrigeration systems and more particularly to methods and apparatus for cooling material by direct contact with $CO_2$.

The use of carbon dioxide for refrigeration purposes is of course well known, and there are many patents issued which disclose the use of carbon dioxide for direct contact cooling. Examples of these include my prior U.S. Pat. Nos. 3,660,985, 3,672,181, and 3,754,407, issued May 9, 1972, June 27, 1972, and Aug. 28, 1973, respectively. Generally when carbon dioxide has been used as a direct contact refrigerant, it has been used as an expendable refrigerant with the resultant carbon dioxide vapor being exhausted to the atmosphere after it has served its cooling or freezing purpose. The rising cost of energy now makes it attractive to attempt to minimize such expenditure of carbon dioxide vapor.

U.S. Pat. No. 3,672,908, issued June 27, 1972 to Hice, discloses a method of cooking food, such as shrimp, beef, tuna, chicken, vegetables and the like utilizing steam under pressure wherein, following cooking, a spray of cold water is used to rapidly lower the surface temperature. Thereafter, freezing of the food is effected using liquid nitrogen or the like. This method has proved attractive for certain foods, and it was felt that advantages could be gained from using carbon dioxide cooling as a part of it.

It has been found that efficient systems can be designed for the carbon dioxide cooling of material wherein the expenditure of the carbon dioxide is minimized by an effective vapor recovery arrangement. Such a system is considered to be particularly advantageous and attractive for use with a steam-cooking process of the general type shown in the aforementioned Hice patent, for it can provide improved results in the overall cooking and freezing method.

Various features of the invention will be apparent from the following detailed description of certain preferred systems embodying various features of the invention when read in conjunction with the accompanying drawings wherein:

FIG. 1 is a diagrammatic view of a system for cooking food and cooling the cooked food by direct contact with carbon dioxide, which system embodies various features of the invention; and FIG. 2 is a partial diagrammatic view showing an alternative arrangement which may be employed as a part of the overall system illustrated in FIG. 1.

Illustrated in FIG. 1 is a refrigeration system 11 in combination with a cooking apparatus 13 of the pressure vessel type which can be pressurized and is designed to permit the selective pressurizing heating, cooling and freezing of the material being cooked. A cooking chamber is defined by a receptacle 15 that is equipped with a hinged door 17 at its front end which can be latch closed and that has a generally cylindrical cavity 19 therewithin. Within the cavity 19 there is mounted a rotatable sleeve 21 which is circular in cross section and which rotates about its central axis driven by a suitable motor and belt arrangement (not shown). A removable basket 23 of a complementary cylindrical shape fits into the rotatable sleeve 21.

A pair of baskets 23 are shown and may be employed to facilitate the unloading and reloading of one basket with the food to be processed while the other basket is within the closed pressure chamber where processing is taking place. The baskets 23 are made of screening material 25 of a suitable mesh to allow the passage therethrough of fluid while retaining therewithin the food material to be processed. Loading is accomplished through a removable entrance panel 27 that is provided in one location on the cylindrical surface. The baskets 23 include strips 29 in the form of shallow channels which both reinforce the end walls and mate with bars 31 mounted on the interior surface of the rotatable sleeve 21 to lock the basket within the sleeve for rotational movement together therewith.

The method of using a rotating basket is intended to provide even cooking and I.Q.F. (Individually Quick Frozen) characteristics to small discrete food items, such as shrimp. However, there are some cases, for example large shrimp, where a natural shape is desired and other cases where tumbling is undesirable, and in these cases the food items are loaded on stationary formed shelves inserted into the pressure chamber.

A pair of headers 33,35 carrying spray nozzles 37,39 are disposed generally along the axis of the pressure chamber supported at the rear wall thereof, and these headers fit through an opening 41 provided in one end wall of the basket 23. In operation, the food to be cooked is filled into the basket 23 through the removable panel 27 to a level of about one-third the diameter of the basket, and then the basket is loaded into the cooker 13, and the hinged door 17 is closed and latched in place. The spray nozzles 37,39 carried by the headers are now spatially within the cylindrical space defined by the basket 23. The first header 33 is connected to a piping arrangement 43 which includes both a water supply line and a steam supply line which are respectively equipped with remote control valves 45,47. The second header 35 is connected to a liquid $CO_2$ supply pipe 49 which is likewise controlled by a remote controlled valve 51.

The refrigeration system 11 includes a standard liquid carbon dioxide storage vessel 53 which is equipped with an oversized freon-type condenser 55 that operates to maintain a desired temperature or pressure within the storage vessel by condensing $CO_2$ vapor in the head space of the vessel as required. Generally, the condenser 55 will be operated to maintain a pressure between about 275 to 300 psig within the vessel, which means the equilibrium temperature is about 0° F.

A liquid feed line 57 extends from a lower portion of the storage vessel and is branched, with one branch extending through a remote-controlled pressure reducing valve 59 to an intermediate liquid tank 61. The other branch extends through a similar remote-controlled pressure reducing valve 63 to a holding tank 65. The intermediate liquid tank 61 is equipped with a liquid level control 67 which opens the feed valve 59 whenever the liquid level within the tank drops below the desired point and closes the valve when it rises above the desired level. Leading from the vapor portion of the intermediate tank 61 is a vapor return line that includes an adjustable back-pressure regulator 69 which senses the pressure with the tank and remains open whenever that pressure is exceeded. This vapor line connects to the main vapor return line 71 leading to a standard heat-exchanger 75 and thence to the suction inlet of a compressor 73 from which the compressed $CO_2$ vapor is returned through an air-cooled finned line and then through the other side of the heat-exchanger 75 to the liquid region of the storage vessel 53.

The purpose of the intermediate tank 61 is to provide a reservoir of colder liquid $CO_2$ than that available in the storage vessel 53 by reducing the pressure some desired amount, for example, to about 100 psig where the equilibrium temperature is about $-45°$ F. This objective is achieved by setting the back-pressure regulator 69 to remain open so long as the pressure within the tank 61 is above this limit, so that the compressor 73 will continue to remove $CO_2$ vapor until the desired pressure level is reached and the regulator closes.

The holding tank 65 serves as a $CO_2$ vapor recovery device, and it likewise contains a liquid level control 77 which opens and closes the remote-control feed valve 63 in the same manner as earlier indicated to maintain a desired liquid level. The upper portion of the holding tank 65 also contains a vapor return branch line containing an adjustable back-pressure regulator 79 which leads into the main vapor return line 71 to the compressor, and the back-pressure regulator 79 is set just below the triple-point pressure of carbon dioxide, i.e., at about 60 psig. The holding tank 65 is first filled with liquid $CO_2$ through the valve 63, and the temperature therein slowly drops as the compressor 73 gradually reduces the pressure in the tank With the evaporation serving to cool the remaining liquid. Eventually, the triple point is reached, and further evaporation results in the formation of solid $CO_2$ which will take the form of slush. If there is ample time for the compressor to operate, the entire tank 65 of the liquid should turn to carbon dioxide snow, after which time operation of the compressor 73 is discontinued as a result of an electrical pressure switch 80, which senses the lowering of pressure in the line 71 after the back pressure regulator 79 has closed. The pressure switch 80 is usually set at about 50 psig. With both the intermediate tank 61 and the holding tank 65 filled and at the desired respective pressures, the refrigeration system 11 is ready to operate as a part of the overall heat treatment, cooling and freezing installation.

The illustrated cooking process is intended to be carried out under superatmospheric pressure, and a vapor supply line 81 from the upper portion of the $CO_2$ storage vessel 53 supplies $CO_2$ vapor at vessel pressure. The vapor supply line 81 is branched, and a suitably sized purge branch 83 extends through a remote-controlled valve 85, that may reduce the pressure if desired, to a tee fitting 87 which is connected to an outlet 89 from the bottom of the pressure cooker 13. The other branch line 91 extends through another remote-controlled valve 93 through a pressure regulator 95 and enters the pressure cooker at a location at the top thereof. A side vent line 97 joins the branch line 91 and contains a relief valve 98. A separate, suitably sized purge-vent line 99 is connected to the uppermost portion of chamber 13 and contains remote-controlled valve 100.

When the cooking process is ready to begin, the desired amount of material, for example, shrimp, is loaded into one of the baskets 23 through the removable panel 27, and the loaded basket is slid into the rotatable sleeve 21 in the pressure cooker 13. After the front door 17 is latched shut, the cooking process is ready to begin, and an automatic control system 102 is actuated.

The pressure chamber cavity 19 is first purged of noncondensables, such as air, by opening the valves 85 and 100 and admitting $CO_2$ vapor pressure to the line 83 leading to the bottom outlet 89 for a predetermined amount of time. The relief valve 98 is set to vent the pressure cooker whenever the pressure exceeds a predetermined pressure, for example, about 80 psig, and should not open during purging. Accordingly, $CO_2$ vapor from the storage vessel 53 purges substantially all of the air from the pressure cooker 13, filling the cavity 19 with a carbon dioxide atmosphere at a pressure slightly above atmospheric which is roughly controlled simply by the diameter of the vent line 99. After the valves 85 and 100 have been open for an appropriate amount of time, for example, 60 seconds, they are closed, and the valve 93 is opened to apply $CO_2$ vapor pressure to the pressure regulator 95, which may be set to open at about 60 psig (which is below the setting of the relief valve 98) so as to maintain this minimum pressure during the entire cooking, cooling and freezing cycle.

So long as the cooking phase of shrimp, for example, is concerned, the pressure regulator 95 may be set to maintain a pressure in the cooker 13 between about 15 and about 40 psig and steam could be used at a pressure between about 40 and 70 psig. However, if the freezing cycle begins below 60 psig., $CO_2$ snow exits from the spray nozzles 39. On the other hand, if the freezing cycle begins above 60 psig, $CO_2$ liquid exits from the spray nozzles 39. Each type of operation has its advantages, both as to the phase of the $CO_2$ and its corresponding temperature, and either may be used. This description is written as though it is desired to spray liquid $CO_2$ from the nozzles 39.

Any suitable heat supply can be used to raise the temperature in the cooker 13 to the temperature desired. However, the injection of live steam is preferred and is utilized in the illustrated embodiment. When the valve 45 in the supply line is opened, steam at a pressure at least above 80 psig (viz., the relief valve 98 setting) is supplied to the header 43 and sprayed onto the shrimp in the basket 23 that is now slowly rotating, driven by the sleeve 21. Steam at this pressure will have a temperature above 325° F., assuming saturated steam is used, and would have a higher temperature if superheated steam were employed.

Cooking is preferably carried out for a period of about 5 to 7 minutes at a temperature between about 200° F. and 225° F. After the desired amount of steam has been injected into the pressure cooker 13 to achieve the temperature, the valve 45 will shut but may reopen subsequently for further steam injection during the cooking period should the temperature fall below that desired.

As soon as the cooking cycle is completed, the valve 47 in the water supply line is opened allowing water under pressure to enter the header 33 and spray onto the food through the nozzles 37. This cooling water spray begins to rapidly lower the temperature of the cooked material and to condense the steam remaining in the cavity 19. Should the pressure, as a result of the condensation, fall below 60 psig, the pressure regulator 95 in the vapor supply line 91 opens and maintains this minimum pressure. Cooling is usually accomplished by spraying water at about 75° F. onto the product in the rotating basket 23 for about one minute, after which time the surface temperature of the material should have been lowered to about 95° F. or below.

At this time, the valve 47 in the water line is closed, and a valve 101 is opened in the drain line leading from the tee 87. The condensed steam and the water which collect in the bottom of the pressure cooker 13 flow out the outlet 89 and through the valve 101, and the water is separated from the $CO_2$ vapor and noncondensables in an automatic trap 103. With most of the water drained from the pressure cooker, the freezing cycle is ready to begin. The valve 93 in the vapor supply line 91 is closed, and the valve 51 in the liquid $CO_2$ feed line is opened causing the liquid $CO_2$ at a pressure of about 100 psig to flow into the header 35 and spray out the individual nozzles 39. Liquid $CO_2$ at this pressure contacts the wet, initially cooled shrimp that are being tumbled in the rotating basket 23. As a result, the outer surface of the shrimp is quickly frozen while still under superatmospheric pressure, which positively seals in the moisture creating a heavier, more succulent product. A metered amount of liquid carbon dioxide is fed to the header 35 for each load of shrimp that is processed.

Previously, carbon dioxide vapor resulting from a direct contact, cooling or freezing process has generally been expanded; however, the illustrated system 11 is designed to recover this vapor. Whereas previously it was felt that the large capital investment in a compressor or the like, which would be able to handle the large amount of vapor generated over a relatively short time period, plus a complicated contaminant clean-up apparatus did not justify recovery, from strictly a cost standpoint. However, the use of the holding tank 65 in the illustrated system 11 not only spreads the work of the compressor 73 over a relatively long period of time, thus requiring only a relatively small compressor, but also simplifies the clean-up.

In the illustrated system, the $CO_2$ vapor and any noncondensables which flow through the trap 103 pass through a back-pressure regulator 105 which is set slightly above the pressure which is maintained in the holding tank 65 to create the reservoir of snow or slush, e.g., at about 65 psig. $CO_2$ vapor flowing through the back pressure regulator 105 enters near the bottom of the holding tank 65, and the vapor is condensed to liquid by the solid $CO_2$ present therein, which correspondingly melts. A relatively large volume of $CO_2$ vapor is generated during the approximately 2–5 minute period that the spraying of liquid $CO_2$ through the nozzles 39 takes place, and recovery of this large volume of vapor is achieved by utilizing the refrigeration capacity of the solid $CO_2$ in the holding tank 65. The solid $CO_2$ both condenses the $CO_2$ vapor and freezes any other contaminants carried by the $CO_2$ that will solidify at about $-70°$ F., which includes just about everything but air. Thus, the system 11 renders economically feasible the recovery of the $CO_2$ vapor because only a moderate-sized compressor and a simple clean-up arrangement are needed as a result of taking advantage of the melting of the snow during the time that injection of liquid $CO_2$ is occurring. Thereafter, the compressor 73 continues to work to "catch up" by re-creating snow in the holding tank 65 while the pressure cooker 13 is being loaded and unloaded and while the cooking and water-cooling steps of the next process cycle are being carried out.

After the metered amount of liquid $CO_2$ has been injected into the pressure chamber, the valve 51 in the liquid $CO_2$ feed line is closed; however, the valve 101 in the outlet line is allowed to stay open for a preset interval of time to allow any remaining liquid $CO_2$ to drain by gravity into the outlet 89, vaporize and be returned through the pressure regulator 105 to the holding tank 65. Once this time interval, e.g., about 15 seconds, expires, the pressure cooker 13 is depressurized by opening a valve 107 in the outlet line to vent the cooking chamber to atmospheric pressure. Even more efficient $CO_2$ recovery may be practiced under some circumstances by connecting vent line 107 to an intermediate receiver which is kept at a low pressure by an additional compressor which discharges to the bottom of holding tank 65. This is referred to as "staging" and can include more than one intermediate receiver and may even use partial vacuum conditions. Following depressurization, the front door 17 is unlatched and swung open, and the basket 23 containing the cooked, frozen shrimp is removed. The other basket 23 carrying a fresh load of shrimp is inserted into the cooker 13, and the process is repeated.

Although the refrigeration system 11 will normally be sized to handle the vapor which is created in one or more pressure cookers (it may be used to service two or more such units), should there be some malfunctioning of the compressor 73 or should there be an unusually heavy period of operation, for perhaps an extended number of 8-hour shifts, provision is made for freezing operation to continue although vapor recovery may be temporarily discontinued. A branch vent line 109 is provided between the trap 103 and the back pressure regulator 105 which contains a relief valve 111 is set to open before vapor pressure builds up to a point where it approaches the pressure in the intermediate tank 61 and thus threatens to shut-off the supply of liquid $CO_2$ to the cooker. Thus, automatic venting through the pressure relief valve 111 temporarily relieves such a build-up each time it occurs.

Although the chamber 19 is initially purged before each process cycle and automatic venting trap 103 is provided in the line between the pressure cooker 13 and the holding tank 65, some contaminants will still reach the holding tank. Those contaminants that are noncondensables, for example, air, will exit through the pressure regulator 79, flow through the compressor 73 and be discharged into the carbon dioxide storage vessel. These noncondensables will accumulate at the very top of the storage vessel 53, and accordingly they will be discharged therefrom at the beginning of each process cycle when the valve 85 is opened and a timed flow of high-pressure vapor is fed into the cooker 13 for the purpose of purging the just-loaded cavity 19. Accordingly, such noncondensable gases will leave the system via the purgevent line 99 when the valve 100 is open.

Condensables, particularly moisture, will liquify or freeze in the holding tank 65. Water ice formed within the holding tank, because it is less dense than liquid carbon dioxide, will float atop the $CO_2$ reservoir. If water ice is allowed to build up to a substantial amount, it is possible that a crust will form across the upper surface which will hamper the ability of the compressor 73 to withdraw vapor from the holding tank and transform the liquid $CO_2$ back into snow. Other problems can also be caused by water ice accumulation, and a lengthening of the time it takes to inject the metered amount of liquid $CO_2$ into the pressure chamber is indicative of such a build-up. Observation of the operation of a particular system in its operating environment will show approximately how many cooking, cooling and freezing cycles can be run before such a condition becomes a possible problem, and thus the potential problem can be anticipated.

With the foregoing in mind and when a period of downtime is forthcoming, for example, over a weekend or overnight, the overall control system 102 is set to a "clean-out" mode of operation. The liquid supply valve 63 to the holding tank 65 is closed, as is the valve 101 in the line between the holding tank and the pressure cooker 13. A heating coil 113 is provided in association with the holding tank 65, and it may be disposed adjacent the inner wall of the tank. The tank is designed to safely withstand an internal pressure of more than 600 psig. Any suitable source of heat may be used, for example, a circulating hot fluid or simply an electrical resistance heater. Heat is applied, and as the temperature within the tank 65 rises, the liquid carbon dioxide evaporates creating vapor that passes out of the top of the tank through the pressure regulator 79 and is returned by the compressor 73 to the storage vessel 53 where it is recondensed. The rate of heating is designed so that the compressor will keep abreast of the amount of $CO_2$ vapor being generated.

After the temperature reaches about $-50°$ F., a valve 115 in the line leading to the compressor 73 is closed, and heating continues until a temperature of $32°$ F. is exceeded which assures that all of the water ice has melted and should reside in the bottom of the holding tank 65 as liquid water. At this time, a valve 117 is opened in a drain line which connects to the very bottom of the holding tank 65, and all of the water and the accumulated condensable impurities, which may contain solid particles or other liquids or oils, are blown out the bottom of the tank into the drain. Thereafter, heating is discontinued, the valve 117 is closed and the control system 102 automatically returns to its normal mode of operation. The holding tank 65 is automatically refilled with liquid carbon dioxide from the storage vessel 53, and the slush-making process thereafter automatically takes place over the remainder of the weekend or night so that the solid $CO_2$ recovery reservoir will be ready for operation when production is ready to begin the next morning. If desired, the control system 102 can be designed to monitor the time to inject the metered amount of liquid $CO_2$ into the pressure chamber and to signal when conditions indicate a substantial water ice accumulation has occurred.

Illustrated in FIG. 2 is an alternative embodiment of a refrigeration system designed for use with the cooking and cooling system illustrated in FIG. 1 which generally differs from that described above in that a double-chamber holding tank is employed. The tank 121 includes a snow reservoir chamber 123 and a liquid reservoir chamber 125 which are interconnected near their lower ends by a pipe 127 which includes a shut-off valve 129.

The system includes a standard liquid carbon dioxide pressure vessel 131 equipped with a freon condenser 133 and a pressure relief valve 135. The liquid $CO_2$ supply line 137 from the lower portion of the storage vessel is branched, and one branch is directed to the double chamber holding tank whereas the other branch can be connected either directly to the pressure vessel wherein the cooking will take place or to an intermediate tank as discussed above with respect to the FIG. 1 illustration. A vapor supply line 139 similar to that shown in FIG. 1 is also used.

During the filling cycle, liquid $CO_2$ is supplied to the holding tank 121 through the branch line which contains a pressure regulator 141 and a remote-controlled shut-off valve 143 which are interconnected via the control system with a liquid level control 145. During filling, the valve 129 between the double chambers is open so that both chambers fill simultaneously. The vapor flows through a pair of vapor return conduits 147,149, both of which are connected to the suction inlet to a compressor-heat-exchanger unit 151 similar to that described with respect to the FIG. 1 installation. The discharge from this unit is via a line 153 which normally connects to the liquid portion of the storage vessel 131. However, should the system have been at rest for some time so that the freon condenser 133 might have substantially lowered the vapor pressure within the storage vessel, a pressure-reading valve 155 opens so that the initial discharge from the compressor unit 151 is into the gas phase of the storage vessel 131 so as to signal the freon condenser 133 to promptly again begin operation.

As soon as the two-chamber holding tank 121 is filled to the desired level, the valve 129 between the two chambers 123,125 is closed, as is the liquid supply valve 143. As soon as the compressor unit 151 reduces the pressure within the double-chamber holding tank 121 to a desired level which is still above the triple point, for example to about 65 psig, a remote-controlled valve 157 in the vapor outlet line 149 from the right-hand or liquid reservoir chamber 125 is closed, thereby isolating this chamber from further action of the compressor. The compressor 151 then proceeds to reduce the pressure in the left-hand chamber 123 below the triple point to cause the formation of snow therewithin as earlier described. A screen 159 is provided near the bottom of the left-hand chamber 123 at a location above the connecting pipe 127 to retain the snow (which will form at the upper surface of the liquid level and then sink). Assuming there is no immediate need for refrigeration, the compressor 151 will continue to operate until all of the liquid $CO_2$ above the screen has been changed to snow, at which time it will shut-off as a result of a signal generated from an optical monitor 160 focused at a region slightly below the surface.

The pressurization, cooking and water-cooling steps of the process take place as described above. Thereafter, when a drain valve 161 is opened, the vapor pressure within the pressure chamber forces the water and any other liquids out its bottom and into a first cyclone separator 163 where the liquid falls to the bottom whereas the vapor exits upward through a central exit. The liquid is automatically removed from the trap 165 in the bottom and discharged to a drain. The vapor is then sent through a cooler 167 where a refrigerated brine solution or the like is circulated to condense moisture remaining in the vapor, which water droplets are removed in a second cyclone 169 separator and likewise discharged via an automatic trap 171 to a drain. The return line 173 then enters the bottom of the left-hand chamber 123 of the holding tank 121 and opens into the tank at a location just above the screen 159 upon which the carbon dioxide snow has accumulated.

At this time, the shut-off valve 129 between the two chambers has been opened so there is liquid communication therebetween. The returning vapor condenses as it melts the carbon dioxide snow, any moisture still in vapor form is frozen to water ice and all noncondensables collect in the upper portion of the lefthand chamber 123. A valve 175 connected to the vapor line 147 exiting from the left-hand chamber 123 leads to a vent valve 177 set at a desired pressure, for example, for about 70 psig. When the system is in the vapor recovery mode, valve 175 can be momentarily opened, and a valve 179 in the line 147 leading to the compressor 151 is closed.

Because the two chambers 123,125 are in liquid communication via the lower pipe, the liquid levels can be arranged to substantially equalize as condensation of vapor and melting of snow occurs in the left-hand chamber and as the compressor 151 removes vapor from the right-hand chamber 125. However, as noncondensables collect in the ullage of the left-hand chamber, the control system will sense that a liquid level gauge 179 on the left-hand chamber is showing too low a level. At this time, the valve 175 in the branch vapor exit line opens momentarily to vent the noncondensables through the vent valve 177 until the liquid levels of both chambers are again substantially equal. Thus the compressor 151 is not caused to do needless work by transferring the air and other noncondensable gases back to the storage vessel 131 before they are ultimately vented as in the FIG. 1 installation. In the event the liquid level in the right-hand chamber 125, as sensed by the gauge 145, becomes too high, a pump 181 is activated to reduce that level by transferring liquid $CO_2$ to the storage vessel 131.

After the valve 161 in the drain line has closed, signalling the end of the freezing and depressurization phase, and after the liquid levels in the two chambers 123,125 have stabilized, the valve 175 is closed and the valve 179 in the main vapor line leading to the compressor 151 is opened. If the liquid levels in the chambers are at the desired levels, the control system returns the refrigeration system to the snow-making phase. If additional liquid $CO_2$ is required to raise the level to that desired, a short fill is provided by opening the valve 143 in the liquid supply line before the shift to the snow-making mode is effected. In the snow-making mode, both the valve 129 in the lower connecting pipe and the valve 157 in the vapor exit line from the right-hand chamber 125 are closed so that the compressor 151 sucks upon the left-hand chamber 123 creating $CO_2$ snow at the upper surface thereof.

Clean-out of water ice and other condensables from the left-hand chamber is effected in the same manner as described with respect to the holding tank 65 when it is indicated that clean-out would be appropriate. With the valve 129 in the connecting pipe 127 and the valve 157 in the vapor return line 149 from the right-hand chamber 125 closed, a heating coil 183 in the left-hand chamber 123 is actuated to raise the temperature therewithin to vaporize all of the carbon dioxide, which is returned via the compressor unit 151 to the storage vessel 131. As soon as all of the liquid $CO_2$ is vaporized, valve 179 is closed and heating is continued. After the temperature climbs above 32° F. so that the water ice is all melted, a valve 185 in a lower drain line is opened, causing the water and other condensables to be blown out the bottom into a drain. Thereafter, refilling and reestablishing of the $CO_2$ slush reservoir in the left-hand chamber is established as indicated above.

Overall, the invention discloses and illustrates systems for employing liquid carbon dioxide for directcontact cooling, which in the context of this application is intended to include freezing, while minimizing the expenditure of the carbon dioxide by an arrangement which enables high percentages of the $CO_2$ vapor to be recovered and re-used. Most importantly, the recovery is effected practically and economically without the requirement for very large capital outlay. Furthermore, the refrigeration system in combination with a pressurized cooking arrangement improves the overall process of cooking, chilling and freezing under pressure that not only adds to the weight and succulence of the product being cooked and frozen, but effects this improvement without excessive increases in processing costs which might otherwise render it economically unattractive.

Although the invention has been illustrated with respect to certain preferred embodiments, it should be understood that modifications as would be obvious to one having the ordinary skill in this art may be made without departing from the scope of the invention which is set forth in the claims that are appended hereto. For example, the direct contact cooling arrangement is not limited to use with a cooking process wherein the cooking is carried out under sequenced pressure and heat, as disclosed in the patent to Hice, but it could likewise be employed in combination with any type of cooking process wherein it is desired to promptly freeze or chill cooked material regardless of whether it has been cooked under pressure. Likewise, it is not limited to use with a spray-type freezing process, but it could also be employed where immersion in a pool of liquid $CO_2$ is used, which will give rise to similar largescale vaporization as well as potential contamination of the vapor and liquid as a result of the direct contact. Moreover, the refrigeration arrangement is not limited to a batch-type process, but could also be used to recover the contaminated, for example, with air, $CO_2$ vapor generated in a continuous food freezer embodying a conveyor wherein the flow rate of product through the freezer will have a tendency to vary with the rate of production of the material being frozen. Accordingly, it should be understood that many combinations of these elements can be created or arranged to perform the same functions, including pairing, i.e., duplicating the element(s), so as to solve problems such as the control and clean-out of contaminants. Still another advantage of the holding tank 121 is that the liquid $CO_2$ to assist the freezing operation could be withdrawn from the holding tank at a location below the screen 159 (or from the right-hand chamber 125) and fed via a pump 189 to the cavity where the direct-contact-cooling is to take place.

Various of the features of the invention are set forth in the claims which follow.

What is claimed is:

1. A method of preparing food which comprises supplying liquid $CO_2$ from a high pressure storage vessel system to a holding tank and creating a coolant reservoir therein containing solid $CO_2$ at a pressure not greater than 60 psig,
   compressing the $CO_2$ vapor created by said solid $CO_2$ formation and returning said vapor to said storage vessel,
   disposing food to be cooked in a chamber,
   pressuring said chamber to superatmospheric pressure with carbon dioxide vapor,
   cooking said food by injection of steam into said chamber while said superatmospheric pressure is maintained,
   freezing said cooked food by injecting liquid $CO_2$ into said chamber whereby $CO_2$ vapor is generated, and
   recovering said $CO_2$ vapor generated in said chamber by condensing said vapor by melting said solid $CO_2$ in said reservoir.

2. A method in accordance with claim 1 wherein said superatmospheric pressure is at least 60 psig and is maintained until after said freezing is effected.

3. A method in accordance with claim 2 wherein liquid $CO_2$ is separated from the solid $CO_2$ in said reservoir and is pumped into said chamber.

4. A method in accordance with claim 1 wherein water from said steam cooking is condensed and removed from said chamber prior to said injection of liquid $CO_2$.

5. A method in accordance with claim 4 wherein said food is maintained under superatmospheric pressure during said freezing step.

6. A method in accordance with claim 4 wherein a pool of intermediate pressure, low temperature liquid $CO_2$ is formed and liquid $CO_2$ from said pool is injected into said chamber.

7. Apparatus for preparing food, which apparatus comprises
a liquid carbon dioxide storage vessel system,
a holding tank,
means for supplying liquid $CO_2$ from said storage vessel system to said holding tank and for lowering the pressure therein below 60 psig to create a coolant reservoir including solid $CO_2$,
means for compressing $CO_2$ vapor from said holding tank and returning said compressed vapor to said storage vessel system,
a cooker including a chamber for receiving food,
means for pressuring said chamber to superatmospheric pressure with $CO_2$ vapor from said storage vessel system,
means for injecting steam into said chamber to cook said food while under said superatmospheric pressure,
means for injecting liquid $CO_2$ into said chamber to freeze said cooked food,
outlet means disposed in a bottom portion of said chamber,
conduit means connecting said outlet means with said holding tank,
said conduit means including a device for draining liquids therefrom while permitting the flow of vapor therethrough, and
pressure regulator means in said conduit means for maintaining a pressure of at least about 65 psig therein
whereby water resulting from condensation of steam drains from said conduit means via said device and whereby the $CO_2$ vapor generated in said chamber flows to said holding tank where it is condensed by melting said solid $CO_2$ in said reservoir.

8. Apparatus in accordance with claim 7 wherein said cooker includes a porous rotatable basket for holding the food and means for rotating said basket.

9. Apparatus in accordance with claim 8 wherein spray nozzle means extends into said chamber at a location generally axial of said rotatable basket and is connected with said steam injection means and said liquid $CO_2$ injection means.

10. Apparatus in accordance with claim 7 wherein heating means is provided for vaporizing all $CO_2$ in said reservoir, wherein a lower outlet from said holding tank is provided which includes valve means and wherein means is provided for removing nonvaporized materials from said holding tank by opening said valve means after the temperature exceeds 32° F.

11. Apparatus in accordance with claim 7 wherein said holding tank includes two separate chambers that are interconnected for fluid flow therebetween at lower locations therein, wherein valve means is provided in said lower interconnection, wherein said conduit means connects with only one of said chambers, and wherein means is provided for venting the upper region of said one chamber when the liquid level within said chambers reaches a predetermined difference.

* * * * *